United States Patent
Lewis et al.

(10) Patent No.: US 7,949,874 B2
(45) Date of Patent: May 24, 2011

(54) SECURE FIRMWARE EXECUTION ENVIRONMENT FOR SYSTEMS EMPLOYING OPTION READ-ONLY MEMORIES

(75) Inventors: Timothy Andrew Lewis, El Dorado Hills, CA (US); Timothy Joseph Markey, San Jose, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 1152 days.

(21) Appl. No.: 11/529,141

(22) Filed: Sep. 28, 2006

(65) Prior Publication Data
US 2008/0082833 A1    Apr. 3, 2008

(51) Int. Cl.
*G06F 21/00* (2006.01)
(52) U.S. Cl. ........... 713/170; 713/2; 710/1; 710/62
(58) Field of Classification Search ........ 713/156, 713/2, 170; 714/27, 34; 710/1, 62
See application file for complete search history.

(56) References Cited

U.S. PATENT DOCUMENTS

| | | | |
|---|---|---|---|
| 5,711,672 A * | 1/1998 | Redford et al. | 434/307 R |
| 6,412,081 B1 * | 6/2002 | Koscal et al. | 714/34 |
| 6,425,079 B1 * | 7/2002 | Mahmoud | 713/2 |
| 2004/0010702 A1 * | 1/2004 | Lewis | 713/194 |
| 2004/0054889 A1 * | 3/2004 | Pitsos | 713/156 |
| 2005/0066073 A1 * | 3/2005 | Jacobs et al. | 710/15 |
| 2006/0047858 A1 * | 3/2006 | Atherton et al. | 710/1 |
| 2006/0253702 A1 * | 11/2006 | Lowell et al. | 713/156 |
| 2007/0011491 A1 * | 1/2007 | Govindarajan et al. | 714/27 |

* cited by examiner

*Primary Examiner* — Vivek Srivastava
*Assistant Examiner* — Thong Truong
(74) *Attorney, Agent, or Firm* — Mahamedi Paradice Kreisman LLP; Christopher J. Brokaw (57) ABSTRACT

A method for providing a secure firmware operating environment includes detecting the presence of a new component, for example, a peripheral device. Next, a determination is made as to whether the peripheral device includes an option read-only memory. Next, a determination is made as to whether the option read-only memory is authorized to be executed on the corresponding device. If the option read-only memory is authorized, the code contained within the option read-only memory is executed. By only allowing execution of peripheral devices or components including authorized option read-only memories, security related breaches are substantially reduced or eliminated; thereby, enhancing device integrity.

23 Claims, 4 Drawing Sheets

SECURE FIRMWARE EXECUTION ENVIRONMENT FOR SYSTEMS EMPLOYING OPTION READ-ONLY MEMORIES

FIELD OF THE INVENTION

The present invention generally relates to secure device operation and, more particularly, to preventing system firmware from executing unauthorized firmware contained within option read only memories.

BACKGROUND OF THE INVENTION

Electronic systems and devices, for example, desktop computers, laptop computers, personal digital assistants (PDAs), set top boxes, servers, point-of-sale (POS) devices, automated teller machines (ATMs), wireless communication devices, for example, cellular telephones and other suitable devices and combinations thereof typically include one or more internal expansion slots to provide for upgraded functionality and/or to allow the system or device to interconnect with other devices, for example, video cards or other peripheral components. Electronic devices also typically include one or more external connection points, for example, USB connections, serial connections and parallel connections which allow a peripheral component to be connected to the electronic device. Typically, such connection points are coupled to one or more of the buses, for example, the peripheral component interconnect (PCI) bus of the corresponding electronic device.

Peripheral devices, for example, video cards, typically include a memory component that stores the operating code specific to the corresponding peripheral device, that is operative independent of the operating system executed on the electronic device or system to which the peripheral device is connected. Such a memory is referred to as an option read only memory (option ROM). In addition to the operating code for the corresponding peripheral device, the option ROM may also include code which facilitates the communication and interoperability of the peripheral device with the electronic device to which it is connected.

System firmware, for example, basic input/output system (BIOS) code or core system software code is maintained within a non-volatile memory of the electronic device and is operative to recognize and initialize the hardware subsystems and components of the electronic device and transfer control of the electronic device to an applicable operating system, upon completion of the initialization process. The system firmware is also responsible for interconnecting to, recognizing and executing the firmware and other code maintained on the option ROMs of peripheral devices.

System integrity problems, in the form of reduced security, may result from the blind or unchecked connection and execution of the code maintained in peripheral option ROMs. Currently, when a peripheral device is connected to an electronic device, the peripheral device is recognized and the system firmware of the electronic device communicates with the peripheral device and provides for the execution of the code maintained with the option ROM of the peripheral device. A drawback with conventional execution methods is that the code maintained within the option ROM may contain or include malicious code that may damage the electronic device or prevent it from operating correctly. The malicious code may also contain viruses that may be transmitted to other devices or systems to which the affected electronic device is connected to.

Currently, the most common security measure employed to prevent an option ROM-based attack is provided by what is referred to as hardware security—the fact that a malicious user or potential hacker has to physically open the device housing and insert the peripheral device into an available expansion slot on a mother board of the electronic device. This may be a tedious and complex process given the structure of the electronic device. For example, laptop computers and PDAs do not have a significant amount of room within the device housing to insert an internal board or other device. Thus, the potential hacker has to have knowledge of the internal architecture of the electronic device, as well as be able to manipulate the limited space within the device housing to insert the peripheral device and corresponding option ROM. This may be time consuming and not worth the effort.

An alternate security measure employed by current electronic devices to prevent an option ROM-based attack is to require the electronic device to start up (or restart) each time a new device is coupled to or detected by the electronic device. This has the drawback of requiring the electronic device to be restarted (or rebooted) each time a peripheral device is added, which may take up a substantial amount of time. However, after the electronic device is restarted, there is no way to prevent any harmful code maintained within the option ROM from propagating throughout the electronic device and into, for example through a network, any devices connected to the affected electronic device.

SUMMARY OF THE INVENTION

A system and method for providing a secure firmware execution environment for systems or devices including option read-only memories is disclosed. A method for providing a secure firmware operating environment includes detecting the presence of a new component. This may be accomplished, for example, by monitoring the expansion slots and/or external connections for new devices, for example, video cards. This may result, for example, by the generation of a hardware or a software interrupt. Next, a determination is made as to whether the new component includes an option read-only memory. This may be accomplished, for example, by determining whether the hardware or software interrupt includes information (e.g. a data bit) indicating whether the new component includes an option read-only memory or other self-contained code. Next, a determination is made as to whether the option read-only memory is authorized to be executed. This may be accomplished, for example, by performing a hash function on the visible portion of data contained within the option read-only memory, and comparing the generated hash value with a list of hash values (or previously authorized images) maintained within a non-volatile memory. Alternatively, a public/private key exchange methodology may be used to determine whether the option read-only memory image is, or has been, cryptographically signed by an authorized authority. Then, execute the code maintained within the option read-only memory if the option read-only memory is authorized.

If it is determined that the option read-only memory is not initially authorized to be executed, the method then attempts to authorize the option read-only memory. This may be accomplished, for example, by adding the hashed image of the option read-only memory to the list of authorized option read-only memories. Such an addition may be the result, for example, of the user approving the addition of the option read-only memory to the approved list; or adding the option read-only memory to the list based on the option read-only memory being originated from a database maintained on a trusted server; or the option read-only memory being originated from a smart token. If the option read-only memory is not authorized to be executed, the process stops and an error message advising of the unauthorized status is sent to the user.

An electronic device implementing the secure execution environment of the present invention includes a processor, an external connector, for example, a serial port, a parallel port, a USB port or a wireless connection port and a memory, for example, a non-volatile memory. The memory maintains instructions, for example, code segments that when executed by the processor, causes the processor to detect the presence of a new component. This may be accomplished, for example, by monitoring the expansion slots and/or external connections for new devices, for example, video cards or USB devices. This may result, for example, by the generation of a hardware or a software interrupt. Next, determine whether the new hardware device includes an option read-only memory. This may be accomplished, for example, by determining whether the hardware or software interrupt includes information (e.g. a data bit) indicating whether the new, or detected, device includes an option read-only memory or other self-contained code. Next, the processor determines whether the option read-only memory is authorized to be executed. This may be accomplished, for example, by the processor performing a hash function on the visible portion of data contained within the option read-only memory, and comparing the generated hash value with a list of hash values (or previously authorized images) maintained within a non-volatile memory. Alternatively, a public/private key exchange methodology may be used to determine whether the option read-only memory image is, or has been, cryptographically signed by an authorized authority. Then, execute the code maintained within the option read-only memory if the option read-only memory is authorized.

An advantage provided by the present invention is that it prevents system firmware from executing unauthorized firmware maintained within option ROMs without affecting system or device performance.

BRIEF DESCRIPTION OF THE DRAWINGS

The present invention and the advantages and features provided thereby will be better appreciated and understood upon review of the following detailed description of the invention, taken in conjunction with the following drawings, where like numerals represent like elements, in which.

DETAILED DESCRIPTION OF THE INVENTION

Figure 1:
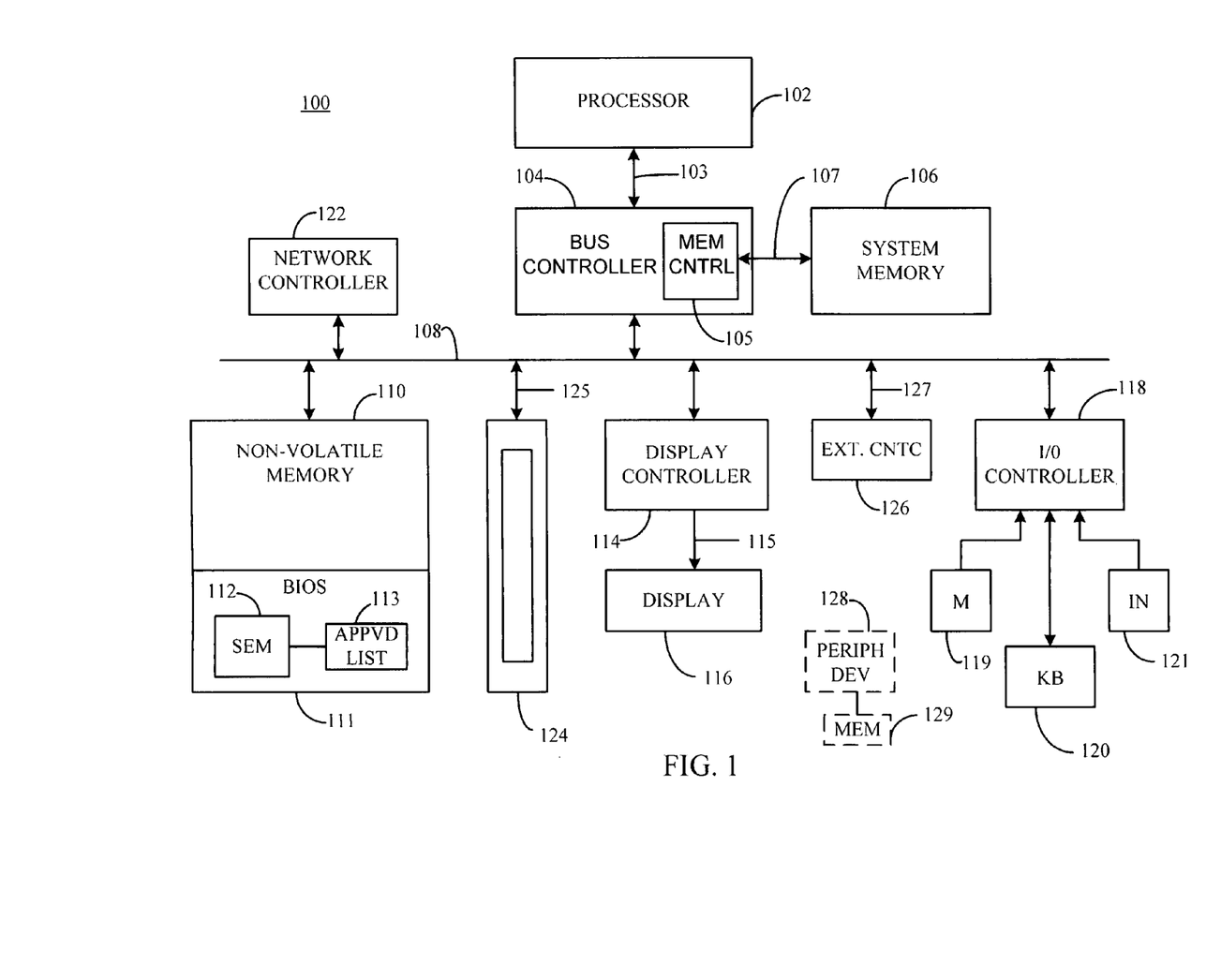
FIG. 1 is a schematic block diagram of an exemplary electronic device configured to provide the secure firmware execution environment according to the present invention.

An exemplary embodiment of the present invention will now be described with reference to FIGS. 1-3B. FIG. 1 is a schematic block diagram of an exemplary electronic device 100, for example, a desktop computer, a laptop computer, a palm top computer, a router or set-top box, a server, a personal digital assistant (PDA), a communication device, for example, a cellular telephone or other suitable device and combination thereof, configured to implement the secure firmware execution environment of the present invention. For purposes of illustration, and not limitation, the electronic device 100 is implemented as a laptop computer; including a peripheral component interconnect (PCI) bus.

The laptop computer 100 includes a processor 102 configured to control the overall operation of the laptop computer 100. The processor 102 may include an arithmetic logic unit (ALU) for performing computations, one or more registers for temporary storage of data and instructions, and a controller for controlling the operations of the laptop computer 100. In one embodiment, the processor 102 includes any one of the x86, Pentium™ and Pentium Pro™ microprocessors manufactured by Intel corporation, or the K-6 or other suitable microprocessor marketed by Advanced Micro Devices. Further examples include the 680X0 processor marketed by Motorola or the Power PC™ or other suitable processor marketed by International Business Machines. In addition, any of a variety of other processors, including those from Sun Microsystems, NEC, Cyrix and others may be used for implementing the processor 102. The processor 102 is not limited to microprocessors, but may take on other forms such as microcontrollers, digital signal processors (DSP), dedicated hardware (e.g. ASIC), state machines or software executing on one or more processors distributed across a network.

The processor 102 is coupled to a bus controller 104 by way of a central processing unit (CPU) bus 103. The bus controller 104 includes a memory controller 105 integrated therein. The memory controller 105 provides for access by the processor 102 or other devices to system memory 106, for example, random access memory (RAM) or other fast access memory device. The bus controller 104 is coupled to a system bus 108, for example, a peripheral component interconnect (PCI) bus, industry standard architecture (ISA) bus, universal serial bus (USB), a wireless connection or other suitable communication medium. Coupled to the system bus 108 is a non-volatile memory 110, for example, a read only memory (ROM), a non-volatile random access memory (NVRAM), a hard disk, a ROM BIOS for maintaining the code segments and corresponding data segments that, when executed by the processor 102, implement and provide the secure firmware execution environment methodology according to the present invention; a display controller 114, operative to transfer data 115 for display on a corresponding display device 116, an input/output (I/O) controller 118 and a network controller 122, for example, a wireless network controller.

When implemented in software, the elements of the present invention are essentially the code segments to perform the necessary tasks. The program or code segments can be stored, for example, in a processor readable medium or transmitted by a computer data signal embodied in a carrier wave over a transmission medium or communication link that can be accessed, for example, by the network controller 122. The processor readable medium may include, for example, an electronic circuit, a semiconductor memory device, a ROM, RAM, a flash memory, an erasable ROM (EROM), a floppy diskette, a CD-ROM, an optical disk, a hard disk, a fiber optic medium, a radio frequency (RF) link or any suitable medium or combination thereof. The computer data signal may include any signal that can propagate over a transmission medium, for example, electronic network channels, optical fibers, air, electromagnetic, RF links or any other suitable medium or combination thereof. The code segments may be downloaded via computer networks, for example, the Internet, LAN, WAN or any suitable network or combination thereof.

The display controller 114 may be implemented by any suitable device, for example, a graphics processor, capable of formatting digital data 115 for proper display and viewing on a corresponding display device 116, for example, a flat panel display, CRT display, printer, plotter or other suitable presentation device and combinations thereof.

The I/O controller 118 may be implemented by any suitable device capable of transferring information, for example, signals containing data and/or instructions between the processor 102 and a variety of input and/or output devices including, but not limited to, a mouse 119, keyboard 120, and pen input device 121. The pen input device 121 may be implemented as a touch screen, soft keys, optical input device or other suitable input devices or combinations thereof.

The network controller 122 may be implemented, for example, by a wireless network access controller or other suitable device or applicable software capable of connecting the underlying laptop computer 100 to a larger network, for example, the Internet.

An internal expansion slot 124 is shown being coupled to the system bus 108 via bus connector 125. Bus connector 125 may be a trace formed within the mother board or a wire connecting the internal expansion slot 124 to the system bus 108. The expansion slot 124 is typically maintained on the mother board that contains the other hardware subsystems 110-122 of the electronic device 100, and is configured to hold a suitable expansion card, for example a video card, for use with the electronic device 100.

An external connection port 126, for example, a USB port, a serial port or a parallel port is coupled to the system bus 108 via bus connector 127. This bus connector 127 may be hardwired, for example, a trace formed within the mother board or a wire connecting the external connection port 126 to the system bus 108, within the electronic device 100 or may be a wireless connection. The external connection port 126 is used to connect peripheral devices 128, for example, a video card, a DVD burner, USB drives or other suitable peripheral devices to the electronic device 100. The peripheral devices 128 connected via internal slot 124 and/or external connection port 126 may include a memory 129, an option read only memory, including operating code that is specific to the corresponding peripheral device 128 and that executes independent of the system firmware 111 that is running on the electronic device 100.

In typical application, when a peripheral device 128, for example, a video card, a DVD burner or other suitable device, and combinations thereof is connected to the electronic device 100, the system firmware 111, for example, the BIOS or other core system software running on the electronic device 100 will detect the peripheral device 128 connected to one of the available ports 124, 126 and allow the peripheral device 128 to operate with the underlying electronic device 100 by allowing execution of the code maintained within the option read-only memory 129 of the peripheral device 128. Security breaches may result from such unchecked operation in the form of malicious code being transmitted to and through the electronic device 100 from the option read-only memory 129 of the peripheral device 128. By allowing the peripheral device 128 to execute without performing any checks on the underlying executable code or determining whether the peripheral device 128 is from a trusted source, an unauthorized user or malicious hacker may cause harm to the electronic device 100 or the larger network to which the electronic device 100 is connected by launching malicious code from the option read-only memory 129. The present invention substantially reduces or eliminates such security breaches by only allowing an authorized option read-only memory (or peripheral device) to be connected to and execute on the electronic device 100.

Figure 2:
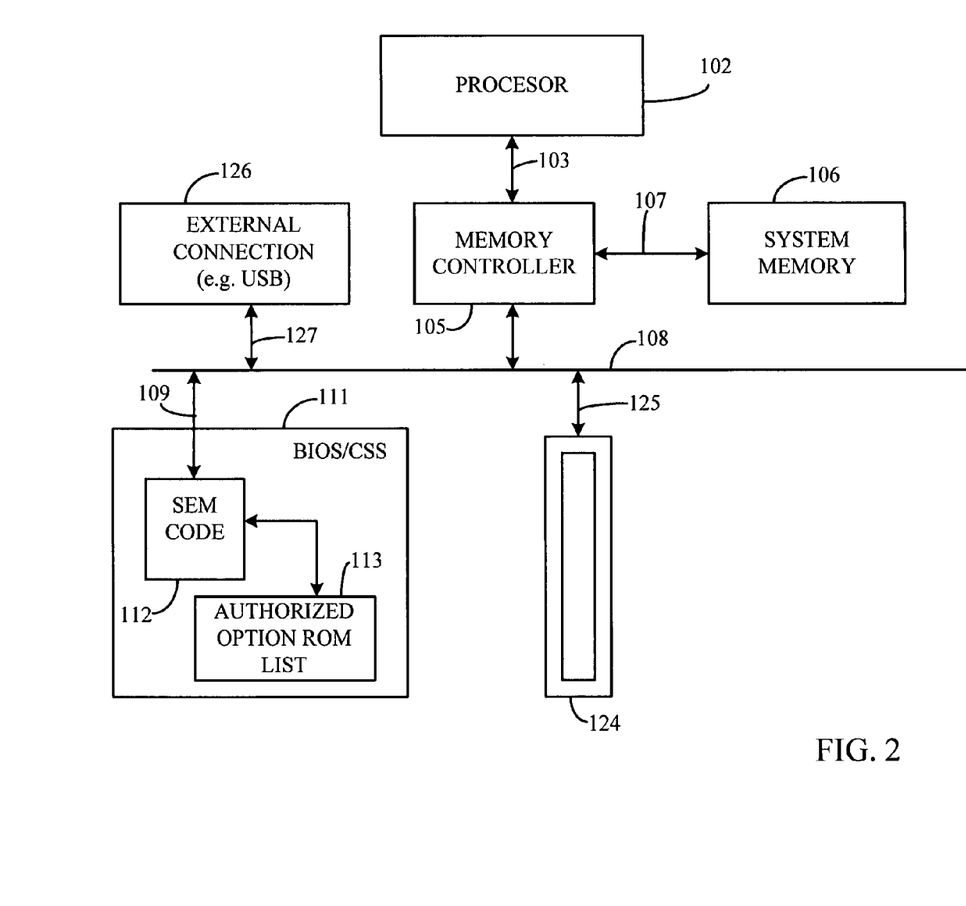
FIG. 2 is a functional block diagram of the components used to implement the secure firmware execution environment according to the present invention.

FIG. 2 is a functional block diagram of the components used to implement the secure firmware execution environment according to the present invention. As illustrated in FIG. 2, the system firmware 111, for example, the BIOS code or other core system software code maintained in the non-volatile memory 110 includes the code segments 112 that are executed by the processor 102 in establishing the secure firmware execution environment of the present invention and a list of option read-only memories 113 that are authorized to be executed on the electronic device 100. The authorized list of option read-only memories (or peripheral devices) 113 may be initially installed by the manufacturer of the electronic device 100, installed by the user or updated, for example, by the secure firmware execution environment method of the present invention.

In application, the code segments 112 are transmitted to the system memory 106 for execution by the processor 102. By being maintained in non-volatile memory 110, the code segments 112 and list of authorized option read-only memories 113 will not be lost or overwritten as a result of power being removed from the electronic device 100. The method of authorizing an option read-only memory and allowing a peripheral device including an option read-only memory to securely execute in conjunction with an electronic device will now be discussed with reference to FIGS. 3A-3B.

Figure 3A:
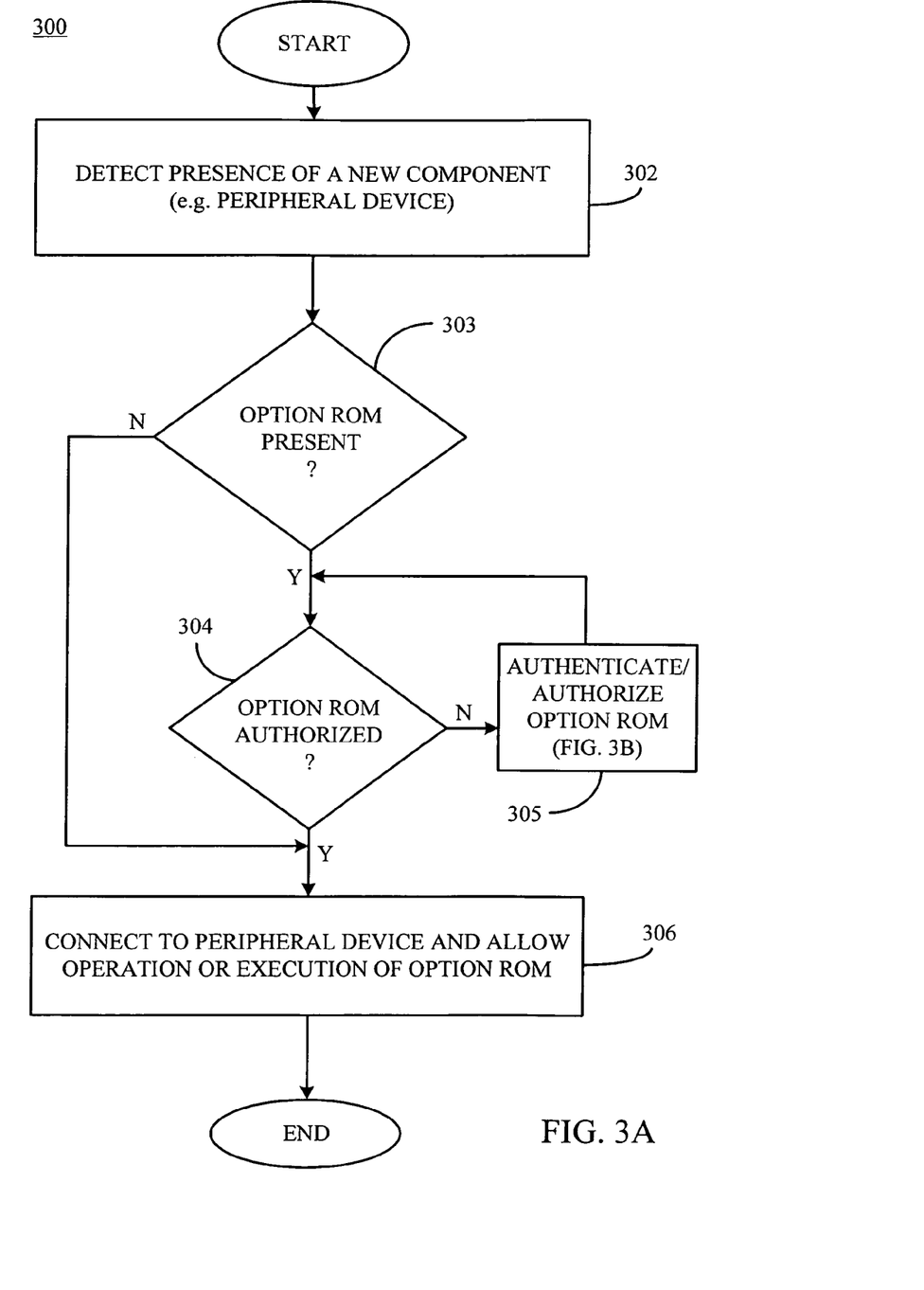
FIGS. 3A-3B is a flow chart illustrating the operations performed by the exemplary electronic device to provide the secure firmware execution environment according to the present invention.
Figure 3B:
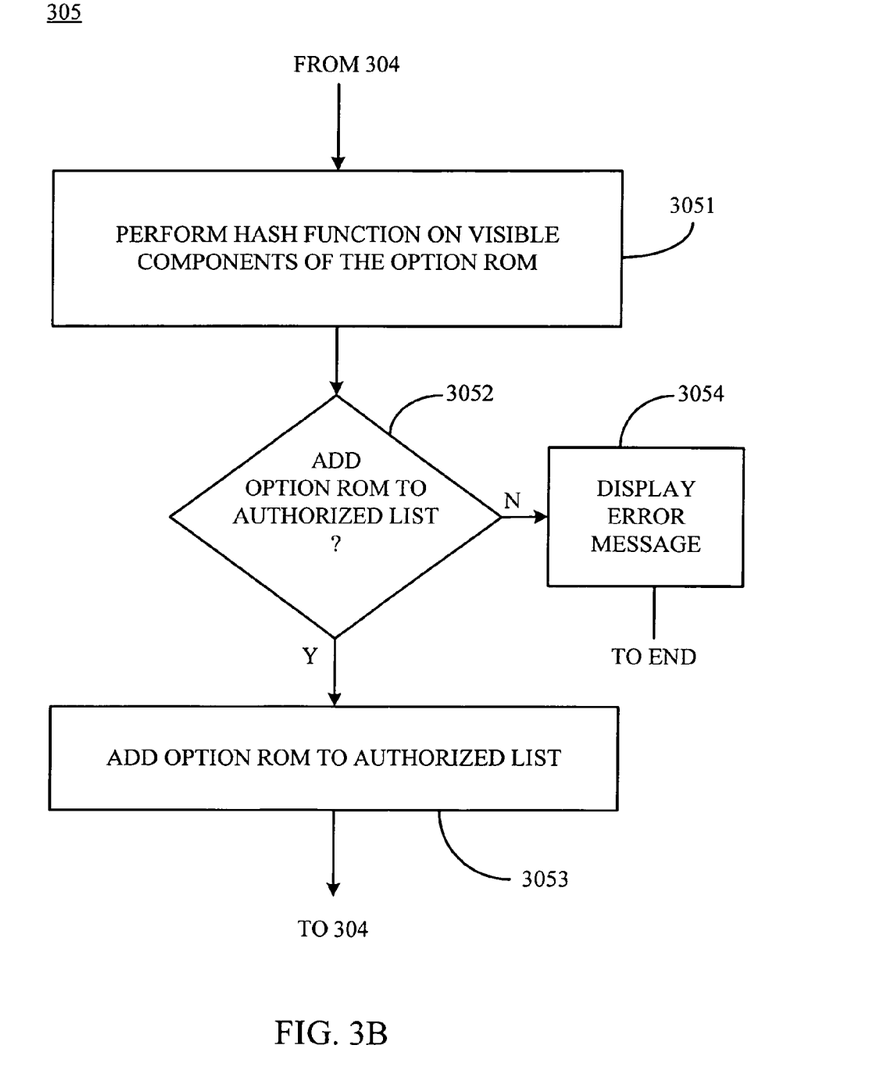

FIGS. 3A-3B is a flow chart illustrating the operations performed by the processor of the exemplary electronic device to provide the secure firmware execution environment of the present invention. Stated another way, the method 300 illustrated in FIGS. 3A-3B, when executed by an electronic device, prevents system firmware (e.g. BIOS or other core system software of the electronic device 100) from executing unauthorized firmware contained within option read-only memories. The following steps are performed during the start up or initialization period (e.g. POST) of the electronic device or otherwise outside of the period that the applicable operation system is executing. Thus, the present invention executes in what is referred to as the pre-operating system environment. The method begins at step 302 and continues through step 306, where normal operation of the electronic device commences or resumes.

In step 302, the electronic device 100 detects the presence of a new component, for example, a peripheral device such as a video card or a DVD burner or other suitable device. This may be accomplished, for example, by the processor monitoring the internal expansion slot and the external connection port or other connection point to the system bus for new devices. This may be accomplished, for example, by the generation of a hardware or software interrupt upon detection of the new peripheral device.

In step 303, a determination is made as to whether an option read-only memory is present on the system bus 108. This may be accomplished, for example, by determining whether the hardware or software interrupt includes information (e.g. one or more data bits) indicating that the new component includes an option read-only memory or other self-contained code. If an option read-only memory is present, the process proceeds to step 304; otherwise, the process proceeds to step 306.

In step 304, a determination is made as to whether the option read-only memory is authorized to be executed on the electronic device. This may be accomplished, for example, by the processor or other suitable controller performing a hash function, for example, a SHA-1 function, on the visible portion of data contained within the option read-only memory, and comparing the generated hash value with a list of hash values (of previously authorized images) maintained within the authorized option-read only list of the non-volatile memory. The list of authorized option read-only memories includes a list of hash values representing the image of authorized option read-only memories. The list may be initially populated by the manufacturer of the underlying electronic device; by the user by adding known option read-only memories to the list; by information and data contained within a smart token; and/or by a central database contained within a trusted server. If the option read-only memory is authorized, in other words, the image (e.g. hash) of the option read-only memory in one of the authorized images contained within the authorized list, the process proceeds to step 306; otherwise, the process moves to step 305.

In step 305, the option read-only memory is authenticated by proceeding through an authorization process. Referring briefly to FIG. 3B, the authorization process will be discussed. In step 3051, the processor performs a hash function, for example, an SHA-1 hash, on the visible portion of the newly detected option read-only memory.

In step 3052, a determination is made as to whether to add the option read-only memory image to the authorized list. This may be accomplished, for example, by the user approving the addition of the option read-only memory image to the authorized list through the entry of a password or other indication of authority into the electronic device; by the image being provided by a central database connected to a trusted server; or by the option read-only memory image being provided from a smart token. Alternatively, a public/private key exchange methodology may be used to determine whether the option read-only memory image is, or has been, cryptographically signed by an authorized authority. Then, execute the code maintained within the option read-only memory if the option read-only memory is authorized.

If the option read-only memory is to be added to the authorized list, the process proceeds to step 3053 where the hashed image of the option read-only memory is written to that portion of the non-volatile memory maintaining the authorized list. The process then returns to step 304. If the option is not be added to the list, the process moves to step 3054.

In step 3054, an error message is displayed to the user indicating that the detected option read-only memory is not authorized and will not be added to the authorized list or executed. As a result, the peripheral device associated with the option read-only memory will not be recognized or allowed to run on or in conjunction with the electronic device. Although described as being a visual warning, the error message provided to the user may be an audible warning, for example, the sounding of an alarm or other audible signal, or a combination of visual and audible warnings. After the error message is displayed or otherwise provided to the user, the authorization process ends and the electronic device resumes pre-authorization execution, enters an intermediary operating state or shuts down.

Returning to FIG. 3A, if the detected option read-only memory is either present in the initial authorized option read-only memory list or added to the authorized option read-only memory list by the authorization process in step 305, the process proceeds to step 306 where the detected peripheral device is permitted to connect to the electronic device and run according to the code maintained in the corresponding option read-only memory. In the situation where the electronic device does not detect the presence of a new peripheral device or option read-only memory in step 303, the electronic device continues to run in a normal manner.

By implementing the method of the present invention, a secure firmware execution environment is established and maintained within an electronic device by preventing the system firmware (e.g. BIOS or core system software) from executing unauthorized firmware or other code maintained with an option read-only memory. In this manner, security breaches related to the application or insertion of peripheral devices to an electronic device or larger system are substantially reduced or eliminated. Additionally, the method of the present invention provides more reliable system security than the hardware or software based security approaches employed by conventional devices.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment(s) disclosed, and that various changes and modifications to the invention are possible in light of the above teachings. Accordingly, the scope of the present invention is to be defined by the claims appended hereto.

What is claimed is:

1. A method for providing a secure firmware operating environment, comprising:
    upon detecting a new component coupled to a first device, determining whether the new component includes an option read only memory, wherein the option read only memory is a memory component that comprises operating code that may be called by the firmware of the first device, and wherein the operating code is associated with a different device than the first device;
    determining whether code contained within the option read only memory is authorized to be executed;
    upon determining that the code contained within the option read only memory is authorized to be executed, executing the code contained within the option read only memory; and
    upon determining that the code contained within the option read only memory is not authorized to be executed, performing: (a) initially preventing the code contained within the option read only memory from being executed, (b) requesting permission, from a user, to add a hash value of the code to a list of authorized option read only memory images, and (c) upon receiving permission, from the user, to add the hash value to the list of authorized option read only memory images, executing the code contained within the option read only memory.

2. The method of claim 1, wherein determining whether the new component includes an option read only memory comprises:
    detecting a hardware interrupt, and
    determining whether the hardware interrupt includes data indicating that the new component includes an option read only memory.

3. The method of claim 1, wherein determining whether the new component includes an option read only memory comprises:
    detecting a software interrupt, and
    determining whether the software interrupt includes data indicating that the new component includes an option read only memory.

4. The method of claim 1, wherein determining whether the option read only memory is authorized comprises:
    performing a hash function on visible components of the detected option read only memory to generate a hash value, and
    comparing the generated hash value with a list of approved hash values, where each approved hash value corresponds to an authorized option read only memory.

5. The method of claim 4, wherein a system receives data indicating that the generated hash value should be added to the list of approved hash values.

6. The method of claim 5, wherein the data indicating that the generated hash value should be added to the approved list is provided by a private key/public key exchange methodology.

7. The method of claim 5, wherein the data indicating that the generated hash value should be added to the approved list is received from an end user.

8. The method of claim 5, wherein the data indicating that the generated hash value should be added to the approved list is received from an external entity.

9. The method of claim 8, wherein the external entity may be one of the following: a database connected to a trusted server and an option read only memory image provided by a smart token.

10. The method of claim 1, further including the step of providing an indication that the option read only memory is not authorized.

11. An electronic device, comprising:
a processor;
an external connector; and
a memory, coupled to the processor, the memory maintaining instructions that when executed by the processor, cause the processor to:
upon detecting a new component coupled to the electronic device, determining whether the new component includes an option read only memory, wherein the option read only memory is a memory component that comprises operating code that may be called by the firmware of the electronic device, wherein the operating code is associated with a different device than the electronic device,
determining whether code contained within the option read only memory is authorized to be executed;
upon determining that the code contained within the option read only memory is authorized to be executed, executing the code contained within the option read only memory; and
upon determining that the code contained within the option read only memory is not authorized to be executed, performing: (a) initially preventing the code contained within the option read only memory from being executed, (b) requesting permission, from a user, to add a hash value of the code to a list of authorized option read only memory images, and (c) upon receiving permission, from the user, to add the hash value to the list of authorized option read only memory images, executing the code contained within the option read only memory.

12. The electronic device of claim 11, where the memory further maintains instructions that when executed by the processor, cause the processor to provide an indication that the option read only memory is not authorized when either the new component or the option read only memory is not authorized to be executed on the electronic device.

13. The electronic device of claim 11, wherein the processor detects a hardware component being connected to the external connector, and further determines whether the connected hardware has caused an interrupt which includes data indicating that the connected component includes an option read only memory.

14. The electronic device of claim 11, wherein the memory maintains instructions, that when executed by the processor, cause the processor to detect a software interrupt, and further determining whether the software interrupt includes data indicating that a connected hardware component includes an option read only memory.

15. The electronic device of claim 11, wherein the memory maintains instructions, that when executed by the processor, cause the processor to perform a hash function on visible components of the detected option read only memory, and comparing the generated hash value with a list of authorized values, where each authorized hash value corresponds to an authorized option read only memory.

16. The electronic device of claim 15, wherein the memory maintains instructions, that when executed by the processor, cause the processor to receive data indicating that the generated hash value should be added to the list of authorized hash values.

17. The electronic device of claim 16, wherein the memory contains a private key, and further maintains instructions that when executed by the processor cause the processor to add the generated hash value to the authorized list in response to the results of a private key/public key exchange methodology.

18. The electronic device of claim 16, wherein the received data indicating that the generated hash value should be added to the authorized list is received from an end user.

19. The electronic device of claim 16, wherein the received data indicating that the generated hash value should be added to the authorized list is received from an external entity.

20. A non-transitory computer readable medium maintaining code segments, that when executed by a processor, cause the processor to:
upon detecting a new component coupled to a first device comprising the computer readable medium, determining whether the new component includes an option read only memory, wherein the option read only memory is a memory component that comprises operating code that may be called by the firmware of the first device, wherein the operating code is associated with a different device than the first device;
determining whether the code contained within the option read only memory is authorized to be executed;
upon determining that the code contained within the option read only memory is authorized to be executed, executing the code contained within the option read only memory; and
upon determining that the code contained within the option read only memory is not authorized to be executed, performing: (a) initially preventing the code contained within the option read only memory from being executed, (b) requesting permission, from a user, to add a hash value of the code to a list of authorized option read only memory images, and (c) upon receiving permission, from the user, to add the hash value to the list of authorized option read only memory images, executing the code contained within the option read only memory.

21. The computer readable medium of claim 20, further including code segments, that when executed by a processor, cause the processor to detect a hardware interrupt, and further determine whether the hardware interrupt includes data indicating that the detected hardware includes an option read only memory.

22. The computer readable medium of claim 20, further including code segments, that when executed by a processor, cause the processor to detect a software interrupt, and further determine whether the software interrupt includes data indicating that the detected hardware includes an option read only memory.

23. The computer readable medium of claim 20, wherein the code segments that provide for the authorization capability further include code segments, that when executed by a processor, further cause the processor to perform a hash function on visible components of the detected option read only memory to generate a hash value, and comparing the generated hash value with a list of authorized hash values, where each authorized hash value corresponds to an authorized option read only memory.

* * * * *